(12) United States Patent
Kim

(10) Patent No.: US 11,480,487 B2
(45) Date of Patent: Oct. 25, 2022

(54) AIR SENSOR THAT DISPLAYS A NUMBER OF PUMPING TIMES FROM AN AIR INLET OF AN AIR-FILLED PRODUCT

(71) Applicant: AIR BOX CO., LTD., Incheon (KR)

(72) Inventor: Byung Joo Kim, Incheon (KR)

(73) Assignee: AIR BOX CO., LTD., Incheon (KR)

( * ) Notice: Subject to any disclaimer, the term of this patent is extended or adjusted under 35 U.S.C. 154(b) by 59 days.

(21) Appl. No.: 17/059,568

(22) PCT Filed: Dec. 2, 2019

(86) PCT No.: PCT/KR2019/016870
§ 371 (c)(1),
(2) Date: Nov. 30, 2020

(87) PCT Pub. No.: WO2021/112269
PCT Pub. Date: Jun. 10, 2021

(65) Prior Publication Data
US 2021/0372877 A1      Dec. 2, 2021

(51) Int. Cl.
*G01L 19/00* (2006.01)
*G01L 9/00* (2006.01)
*A63B 24/00* (2006.01)
*A63B 5/20* (2006.01)

(52) U.S. Cl.
CPC ...... *G01L 19/0046* (2013.01); *A63B 24/0062* (2013.01); *G01L 9/0041* (2013.01); *A63B 5/20* (2013.01); *A63B 2220/53* (2013.01)

(58) Field of Classification Search
None
See application file for complete search history.

(56) References Cited

U.S. PATENT DOCUMENTS

| 1,489,164 | A | * | 4/1924 | Smith | G01L 17/00 137/227 |
| 4,748,845 | A | * | 6/1988 | Rocco | G01L 17/00 73/756 |
| 9,717,944 | B2 | * | 8/2017 | Jeon | G09B 19/003 |
| 2004/0019286 | A1 | * | 1/2004 | Lia | G01L 19/14 600/491 |

(Continued)

FOREIGN PATENT DOCUMENTS

| CN | 104236784 B | * | 7/2016 | G01L 19/00 |
| KR | 1020090031180 A | | 3/2009 | |

(Continued)

*Primary Examiner* — Peter J Macchiarolo
*Assistant Examiner* — Jermaine L Jenkins
(74) *Attorney, Agent, or Firm* — Rabin & Berdo, P.C.

(57) ABSTRACT

Provided is an air sensor, coupled to an air inlet of an air-filled product that is filled with air to maintain a shape thereof, the air sensor including: a connector coupled to the air inlet and communicated with an interior of the air-filled product, thereby allowing air in the air-filled product to be introduced into an interior of the connector; a silicon sensor provided inside the connector, thereby being operated by air pressure of the air-filled product; an impact sensor configured to detect an impact caused by an operation of the silicon sensor; and a PCB connected to the impact sensor, thereby displaying the number of times according to a detection signal of the impact sensor.

10 Claims, 5 Drawing Sheets

(56) References Cited

U.S. PATENT DOCUMENTS

| | | | |
|---|---|---|---|
| 2011/0269600 A1* | 11/2011 | Houle | A63B 69/0035 482/8 |
| 2013/0280684 A1* | 10/2013 | Gordon | A63B 5/20 434/247 |
| 2017/0080279 A1* | 3/2017 | Arredondo | A63B 21/4037 |
| 2018/0043205 A1* | 2/2018 | Duffy | B32B 27/065 |
| 2019/0086245 A1* | 3/2019 | Kim | G01P 1/026 |

FOREIGN PATENT DOCUMENTS

| | | |
|---|---|---|
| KR | 1020110015067 A | 2/2011 |
| KR | 101280223 B1 | 7/2013 |

\* cited by examiner

AIR SENSOR THAT DISPLAYS A NUMBER OF PUMPING TIMES FROM AN AIR INLET OF AN AIR-FILLED PRODUCT

TECHNICAL FIELD

The present disclosure relates to an air sensor and, more particularly, to an air sensor installed at an air inlet of a product filled with air, thereby detecting a change in pressure of the air filled in the product.

BACKGROUND ART

Recently, people have increased interest in weight management for health or beauty. However, as computers become popular and various computer games are developed, outdoor activities of the people are reduced. Accordingly, there are many cases of people being overweight or lacking exercise, whereby people do simple exercises such as jumping rope or jogging indoors such as at home or in the office.

In general, a jump rope is a device consisting of a long rope made by extrusion molding a flexible synthetic resin material and a pair of handles installed at opposite ends of the rope. After holding the handles in each hand, a rope jumper rotates the rope around his or her body and, at the same time, jumps before the rotating rope hits the floor, thereby allowing the rope to be crossed so that the rope continues to rotate. Jumping rope is an exercise that counts an activity of jumping over the rotating rope as one time of the movement.

Jumping rope as described above may be an exercise that uses the whole body evenly, including the arms that rotate the rope and the legs used for jumping so as to get enough exercise effects just by exercising for 10 minutes and, therefore, is a popular exercise that may be easily enjoyed by both men and women.

In addition, the jumping rope exercise is characterized to be an up and down movement where jumping is performed using a front part of the soles of the feet. The jumping rope exercise is effective in strengthening each body function because it gives intense stimulation to the ankles, calves, knees, waist, and the like whenever the exerciser jumps to do the jumping rope exercise.

Such stimulation is known to affect the osteoblasts of the bones, thereby promoting the growth of adolescents, but is also effective in preventing osteoporosis in adults.

In addition, since the jumping rope exercise is a continuous exercise of small, rhythmical jumps, the heart and lungs are strengthened, and coordination that matches the timing of hands and feet is developed. Such coordination improves quick adaptation ability, flexibility, agility, balance, and endurance. In addition, the jumping rope exercise may even relieve stress.

The exerciser may enjoy the jumping rope exercise in a variety of exercises with only the jump rope. Depending on the way to jump, the exerciser may enjoy a variety of jumping rope exercise methods such as a double leg jump, alternate foot step jump, single leg jump, consecutive double jump, and the like.

Jumping rope has an advantage of being enjoyed at any time with a simple exercise device called the jump rope. However, due to the nature of the jumping rope, the exerciser crossing the rope has to leap continuously, so there is a problem of an inter-floor noise caused by impact sounds generated when the exerciser leaps and when the rope touches a floor. Therefore, there are many restrictions to enjoy the jumping rope exercise indoors.

In consideration of such aspects, an air mat or air board, which allows the exerciser to enjoy jumping rope exercises or jumping exercises indoors as much as the exerciser likes, has been developed and proposed as in Korean Patent No. 10-1280223 (hereinafter referred to as 'patent document 1 of documents of related art) and Korean Patent Application Publication No. 10-2011-0015067 (hereinafter referred to as 'patent document 2 of the documents of related art).

In the patent documents 1 and 2, a multi-functional air board is disclosed, wherein the air board expands to a predetermined size in volume by air injected thereinto through an air inlet and is composed of double wall fabrics that are allowed to be spaced apart by a certain height by a plurality of yarn fibers formed at the inner space of the air board. In addition, a reinforcing part is fixedly coupled to a bottom part of the air board, and a second coupling portion is formed in the reinforcing part. When a user wants to make a leap movement, a first coupling portion of an air footrest is coupled to the second coupling portion, and when the user wants to use the air board as either one of a kick board or a mat by grabbing the handle in a state of the air board being placed on a water surface, a third coupling portion of the handle is coupled to the second coupling portion.

After being installed on an indoor living room or floor, or on the outside flat ground, such air boards may suppress the inter-floor noise even when the user climbs thereon and continuously repeats jumping rope, walking in place, leaping and landing, jumping, and the like. Accordingly, the exercises may be continuously performed indoors.

However, when the user performs exercises such as jumping rope or jumping, repetitive jumping and landing, walking in place, and the like using the conventional air board disclosed in the patent documents 1 and 2, there is discomfort that the user who is exercising has to directly count the number of exercises performed thereby, or a nearby assistant has to count the number of exercises performed by the user.

DOCUMENTS OF RELATED ART

Patent Documents (Patent Document 1) Korean Patent No. 10-1280223
(Patent Document 2) Korean Patent Application Publication No. 10-2011-0015067

DISCLOSURE

Technical Problem

Accordingly, the present disclosure has been made keeping in mind the above problems occurring in the related art, and an objective of the present disclosure is to provide an air sensor that is provided at an air inlet of an air-filled product which has air filled and stored therein, detects a change in pressure of air due to the pumping of the air-filled product, and displays the number of pumping times.

Technical Solution

In order to accomplish the above objective, there may be provided an air sensor, according to the present disclosure, provided by being coupled to an air inlet of an air-filled product that maintains a shape thereof by being filled with air, the air sensor including: a connector coupled to the air inlet and communicated with an interior of the air-filled product, thereby allowing air in the air-filled product to be introduced into an interior of the connector; a silicon sensor provided inside the connector, thereby being operated by air pressure of the air-filled product; an impact sensor configured to detect an impact caused by an operation of the silicon sensor; and a PCB connected to the impact sensor, thereby displaying the number of times according to a detection signal of the impact sensor.

In addition, the connector may include: a diaphragm provided inside the connector, thereby partitioning an inner space of the connector; and an inlet and an outlet, respectively formed by penetrating through the diaphragm and configured to allow air pressure of the air-filled product to be introduced and discharged therethrough.

Furthermore, the inlet may be formed in the diaphragm so that a diameter thereof becomes narrower toward the silicon sensor, and the outlet may be formed in the diaphragm so that a diameter thereof becomes narrower toward the air-filled product.

In addition, the silicon sensor may be provided therein with a sensor film facing the diaphragm of the connector, and the sensor film may be stretched and contracted toward the impact sensor by air pressure through the inlet of the diaphragm, thereby being detected by the impact sensor.

In addition, an isolating plate may be provided between the silicon sensor and the impact sensor to isolate the silicon sensor and the impact sensor from each other, and lattice holes may be provided in the isolating plate to allow a stretching force of the sensor film of the silicon sensor to be transmitted to and detected by the impact sensor.

Accordingly, a user who performs jumping rope or a jumping exercise on an air-filled product may be easily aware of the number of jumping, thereby accurately recognizing an amount of exercise or learning.

Advantageous Effects

As described above, according to an air sensor of the present disclosure, the air sensor is provided by being detachably installed at the air inlet of the air-filled product which has air filled and stored therein, thereby being operated each time when the air-filled product is pumped by an external force applied thereto and accurately displaying the number of pumping times. Accordingly, there is an advantage that the user can easily recognize the exact amount of exercise or learning.

BEST MODE

Figure 1:
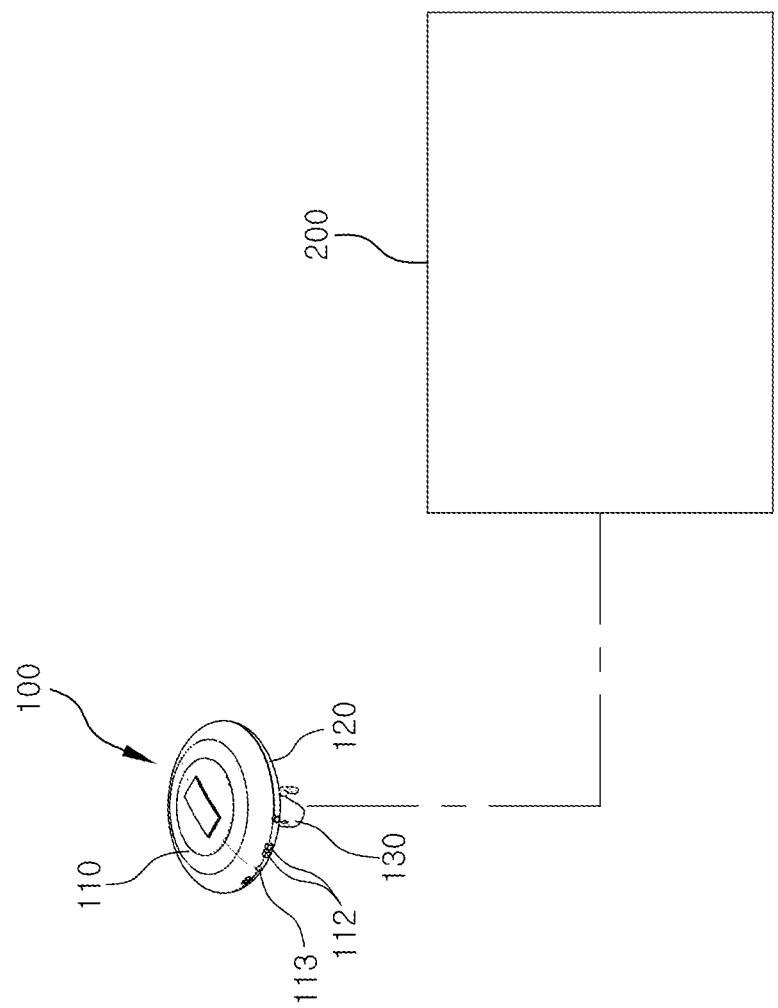
FIG. 1 is a view showing a configuration of an air sensor according to the present disclosure.

Hereinafter, an exemplary embodiment of the present disclosure will be described in detail with reference to the accompanying drawings.

All terms used in the present disclosure are terms defined in consideration of functions in the present disclosure, which may vary according to the intention or custom of users or operators, so the definitions of the terms should be interpreted as a concept corresponding to the technical matters of the present disclosure.

In addition, the embodiment of the present disclosure does not limit the scope of the present disclosure but is merely illustrative of the elements presented in the claims of the present disclosure. In addition, the embodiment is included in the technical idea throughout the specification of the present disclosure and includes a component that may be substituted as an equivalent in the component in the claims.

In addition, optional terms in the following embodiment are used to distinguish one component from other components, and the component is not limited by the terms.

Accordingly, in the description of the present disclosure, detailed descriptions of related known technologies that may unnecessarily obfuscate the subject matter of the present disclosure are omitted, the same reference numerals are assigned to parts the same as those of the related art, and redundant descriptions are omitted.

FIGS. 1 to 5 are views showing an air sensor and configurations thereof according to the present disclosure.

As shown in drawings, the air sensor 100 according to the present disclosure is a device that is installed at an air inlet of an air-filled product 200 and configured to detect a change in air pressure due to pumping of the air-filled product 200, count the number of times the air-filled product 200 is pumped, and display the counted number in numerals.

Figure 2:
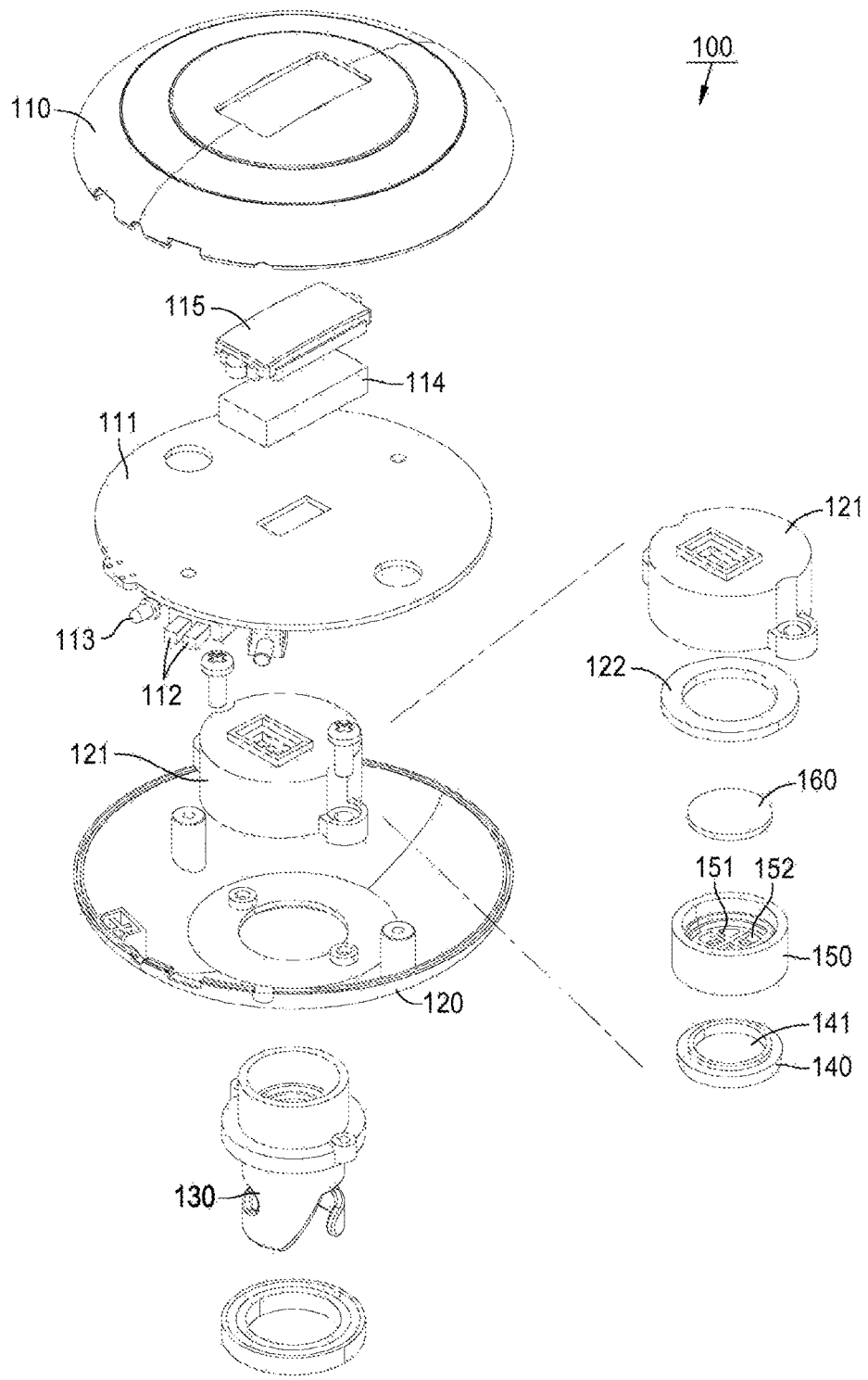
FIG. 2 is an exploded view of the air sensor according to the present disclosure.
Figure 3:
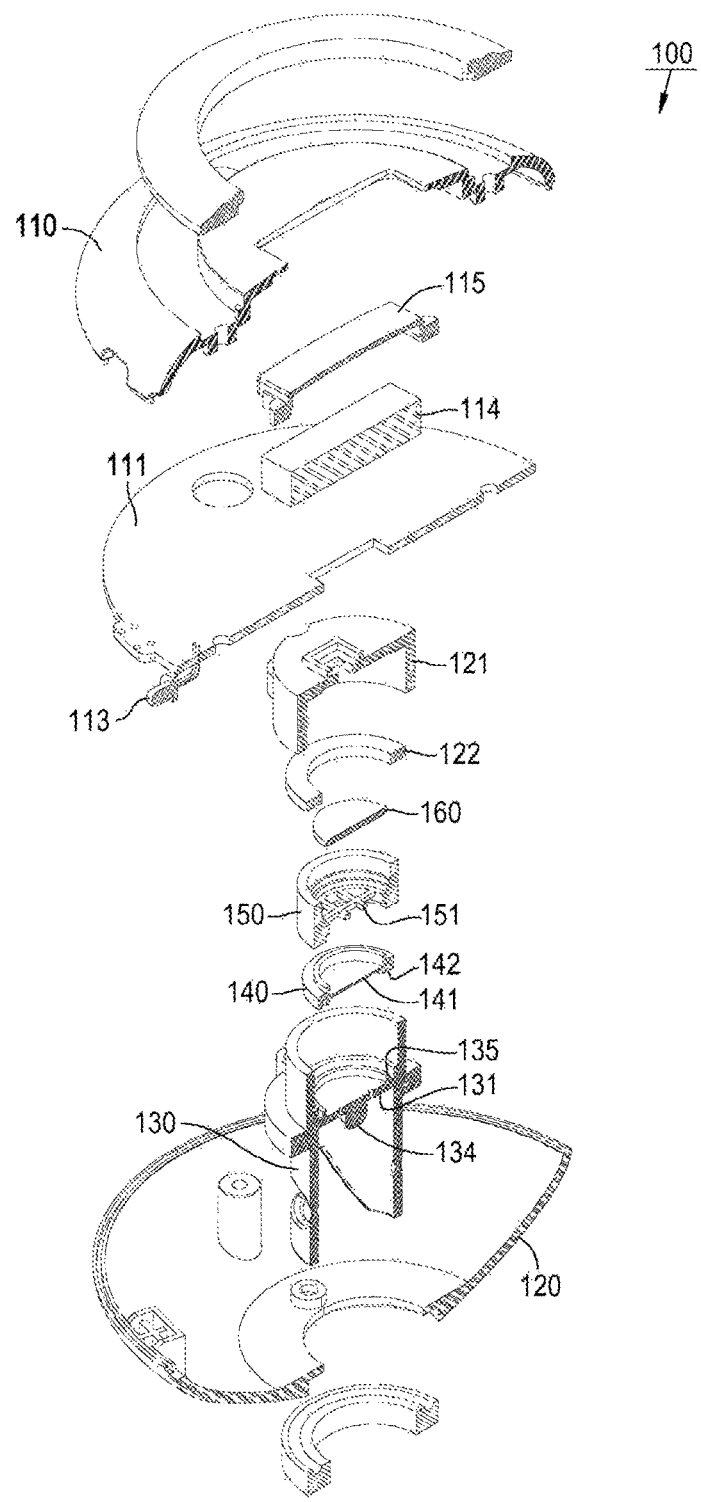
FIG. 3 is an exploded half-sectional view of the air sensor according to the present disclosure.

The air sensor 100 includes an upper casing 110 and a lower casing 120 as shown in FIGS. 1 to 3 and further includes a connector 130, a silicon sensor 140, a guide bushing 150, an impact sensor 160, and the like provided in the lower casing 120.

As shown in FIGS. 2 and 3, the upper casing 110 is a semi-spherical member and is provided with a printed circuit board 111 (PCB, hereinafter referred to as "PCB") horizontally disposed in a diametrical direction and fixed therein.

At an outer periphery portion of the PCB 111, a power switch 112 that turns on/off the power of the air sensor 100, and a lighting lamp 113 indicating whether the air sensor 100 is operated when the power switch 112 is turned on are provided. That is, the lighting lamp 113 may be provided to be turned on when the air sensor 100 is operated and to be turned off when the air sensor 100 is not operated.

In addition, a display unit 114 configured to indicate the number of times the air-filled product 200 is pumped in numerals is electrically connected to and provided on a top surface of the PCB 111, and a transparent cover 115 is provided above a top surface of the display unit 114, thereby protecting the display unit 114. The cover 115 is fastened and fixed to an inner side surface of the upper casing 110 with screws, and an outer side surface of the cover 115 is provided to form the same surface as an outer side surface of the upper casing 110.

In addition, the PCB 111 is electrically connected to the impact sensor 160 to be described later with a wire and converts the detection signal of the impact sensor 160 into an electrical signal, thereby allowing the number of times of the detection signal detected by the impact sensor 160 to be indicated in numerals through the display unit 114. In this case, the numerals may be interlocked, by being linked by wireless communication, with a server such as a smartphone, a tablet PC, a desktop, or the like.

The lower casing 120 is a semi-spherical member that is provided by being fastened to a bottom surface of the upper casing 110 and has a sensing part of the air sensor 100 to be described later, that is, a mounting portion 121, provided therein, wherein the mounting portion 121 is mounted with the connector 130, the silicon sensor 140, the guide bushing 150, and the shock sensor 160 therein.

The mounting portion 121 is formed in a "∩" sectional shape with an open bottom surface and is fastened and fixed to the inner side surface of the lower casing 120 as a screw.

Figure 4:
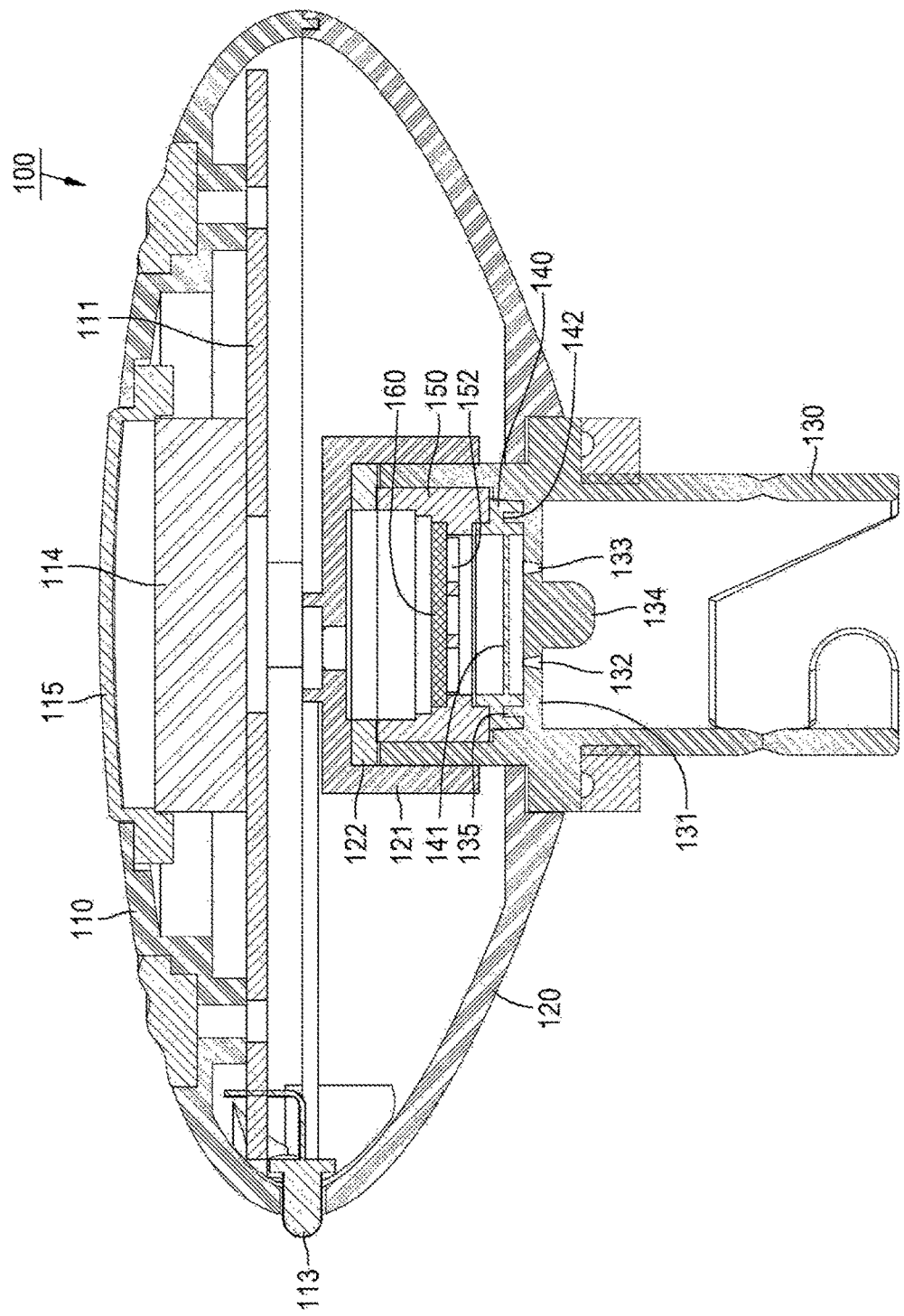
FIG. 4 is a sectional view of the assembled air sensor according to the present disclosure.
Figure 5:
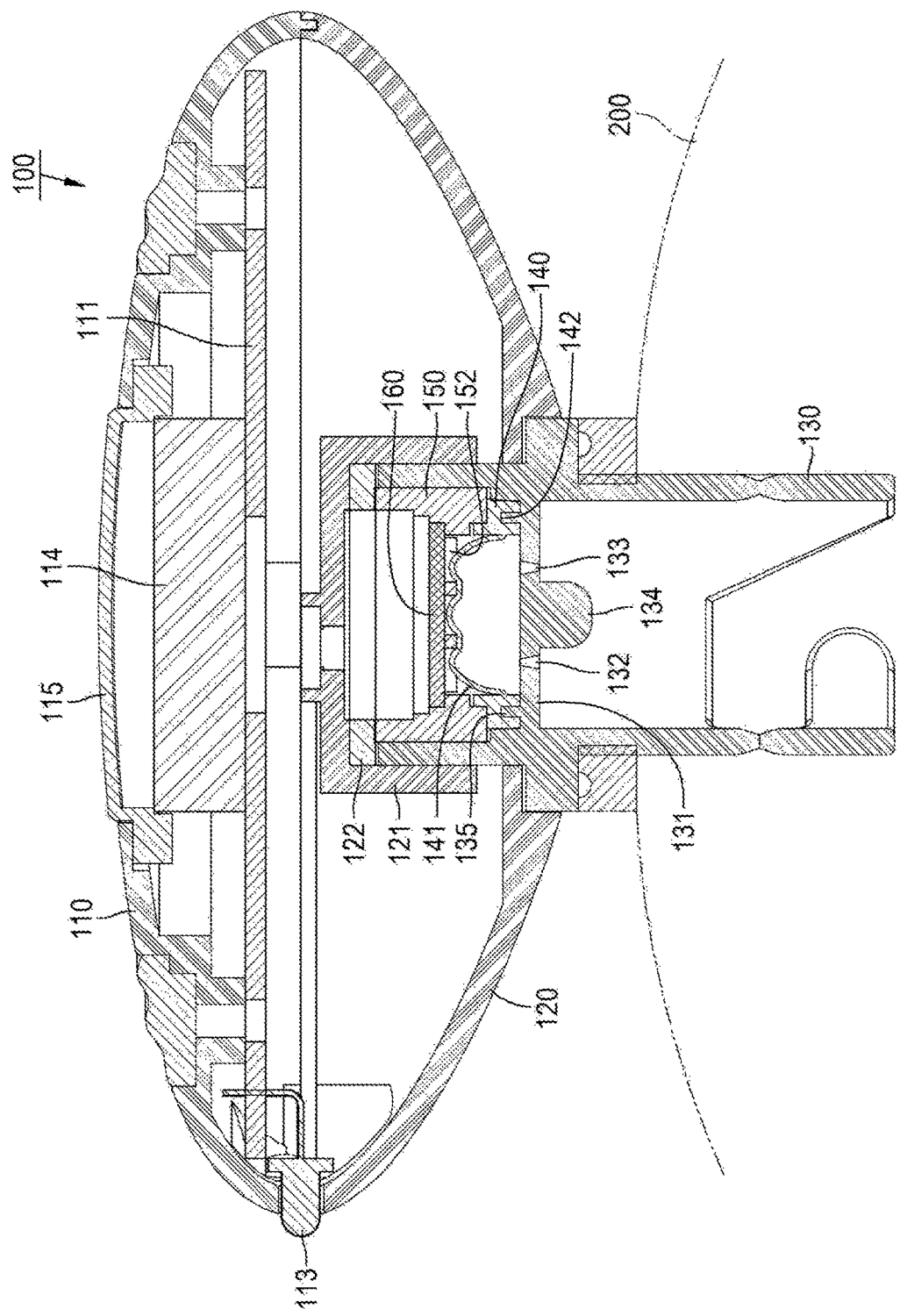
FIG. 5 is a sectional view showing an operating state of the air sensor according to the present disclosure.

Meanwhile, as shown in FIGS. 4 and 5, the upper end of the connector 130 is inserted and fixed to the mounting part 121 of the lower casing 120 as described above, and between the connector 130 and the mounting part 121, a ring-shaped packing 122 for sealing is interposed therebetween.

The connector 130 is formed of a cylindrical tube whose top and bottom surfaces are open. Here, the upper end portion of the connector 130 is provided by being sealed through the medium of a packing 122 on the inner side surface of the mounting portion 121, and the lower end portion of the connector 130 is provided to be fastened and fixed as being rotated in one direction in a state of being inserted into the air inlet of the air-filled product 200. As such, when the connector 130 is connected to the air inlet of the air-filled product 200, the air-filled product 200 and the connector 130 communicate with each other so that the air filled in the air-filled product 200 is introduced and filled into the interior of the connector 130.

In addition, a diaphragm 131 blocking the conduit of the connector 130 is formed inside the connector 130, and with the diaphragm 131 as a reference, the air inlet of the air-filled product 200 is connected to the lower part of the connector 130, and the silicon sensor 140, the guide bushing 150, and the impact sensor 160 are sequentially accommodated and provided in the connector 130 above the top part of the diaphragm 131.

In particular, on a top surface of the diaphragm 131, a circular coupling protrusion 135 accommodating an inlet 132 and an outlet 133 to be described later therein is formed to protrude upward, and the silicon sensor 140 is engagedly provided to the coupling protrusion 135.

The silicon sensor 140 is a cylindrical tube with open upper and lower surfaces, and a coupling groove 142 corresponding to the coupling protrusion 135 of the diaphragm 131 is formed on a lower surface thereof and is inserted into the coupling protrusion 135 to be coupled and fixed. In addition, a sensor film 141 blocking a pipeline of the silicon sensor 140 is provided inside the silicon sensor 140.

The sensor film 141 is a thin film formed of a silicon material having elasticity, thereby being stretched upward by the air pressure of the air-filled product 200 flowing into the connector 130 and then being returned to its original position by its own restoring force (elastic force) so that a flat state thereof is maintained within the silicon sensor 140.

Accordingly, the air pressure of the air-filled product 200 applied to the inside of the connector 130 is blocked by the sensor film 141 of the silicon sensor 140 and is not allowed to be introduced into the upper portion of the sensor film 141. Accordingly, with the sensor film 141 as a reference, upper and lower portions of the silicon sensor 140 are provided in a state in which the flow of air is completely blocked.

A cylindrical guide bushing 150 is provided on a top part of the silicon sensor 140 as described above, and a bottom surface of the guide bushing 150 is provided by being mounted on a top surface of the silicon sensor 140.

The guide bushing 150 includes an isolating plate 151 that divides the inner space of the guide bushing 150 therein into upper and lower parts, and a plurality of grid holes 152 are formed in the isolating plate 151.

Here, the reason why the isolating plate 151 is formed inside the guide bushing 150 is to prevent the sensor film 141 of the silicon sensor 140 from being malfunctioned, which is caused by the air pressure applied to the sensor film 141 when the isolating plate 151 is not formed inside the guide bushing 150. In other words, when the sensor film 141 is stretched upward and is sensed by the impact sensor 160 to be described later when the isolating plate 151 is not formed inside the guide bushing 150, a malfunction may occur such that the sensor film 141 sticks to the impact sensor 160 and does not fall off. Accordingly, in order to prevent such malfunction, the isolating plate 151 is formed inside the guide bushing 150 in advance so as to prevent adhesion of the sensor film 141 to the shock sensor 160.

In addition, the reason why the lattice holes 152 are formed in the isolating plate 151 is as follows. Even when the sensor film 141 is curved upward, thereby being stuck to the isolating plate 151 and not falling off, the stretching and contractile force of a portion, which is not stuck with the isolating plate 151, of one side of the sensor film 141 may change the air pressure inside the sealed mounting portion 121 through the lattice holes 152. As a result, the change of the air pressure inside the sealed mounting portion 121 may be transmitted to the impact sensor 160, thereby allowing the air sensor 100 to entirely perform its functions.

On the other hand, in a state of being seated on a top surface of the isolating plate 151 of the guide bushing 150 as described above, the impact sensor 160 is provided to be fixed to the guide bushing 150. Here, the impact sensor 160 generates a detection signal through stretching and contraction (shaking) with the sensor film 141 of the silicon sensor 140. At this time, the magnitude of the stretching force of the sensor film 141 transmitted to the impact sensor 160 is due to an external impact force, and the magnitude of the stretching of the sensor film 141 is determined by the pumping force caused by the external impact acting thereon. Therefore, the impact detection sensor 160 may calculate and measure the jumping height of the user by the stretching force transmitted from the sensor film 141.

In addition, an inlet 132 and an outlet 133 configured to allow air pressure of the air-filled product 200 acting on the connector 130 may pass therethrough are formed by penetrating through the diaphragm 131 of the connector 130 as described above, respectively. In this case, the inlet 132 is formed to have a diameter that gradually decreases from the bottom to the top of the diaphragm 131, and the outlet 133 is formed to have a diameter that gradually decreases from the top to the bottom.

The air pressure of the air-filled product 200 that has flowed into the connector 130 through the inlet 132 and outlet 133 formed as described above is quickly introduced between the diaphragm 131 and the silicon sensor 140 through the inlet 132, thereby stretching the sensor film 141 toward the upper impact sensor 160. Subsequently, the air pressure applied to the sensor film 141 lets an air flow to be quickly discharged through the outlet 133.

As a result, the air pressure flows quickly through the inlet 132 and the outlet 133 of the diaphragm 131, so that the sensor film 141 may also be quickly restored to its original shape and be maintained.

In addition, a pressing protrusion 134 is protrudingly formed at the center of the lower surface of the diaphragm 131 and is configured to press an air outlet valve at the air inlet when the connector 130 is connected to the air inlet of the air-filled product 200 in order for the air in the product 200 to be introduced into the connector 130 and act thereon.

The operating relationship of the air sensor according to the present disclosure as described above will be described.

After inserting the connector 130 of the air sensor 100 into the air inlet of the air-filled product 200 to which the air sensor 100 is to be installed, the connector 130 is fastened and fixed to the air inlet by being rotated in one direction.

Then, while the connector 130 of the air sensor 100 is being fastened and fixed to the air inlet of the air-filled product 200, the air inlet and the flow path of the connector 130 are connected in communication with each other. Accordingly, the air in the air-filled product 200 is introduced into the connector 130 and filled therein, and the air filled into the connector 130 is filled through the inlet 132 and the outlet 133 of the diaphragm 131 to a state in which the space between the sensor film 141 of the silicon sensor 140 and the diaphragm 131 is full.

In such a state, the power switch 112 of the air sensor 100 is turned on to light the lighting lamp 113 and to operate the display unit 114. Then, when the air-filled product 200 is pumped by an exercise being performed such as jumping, the air pressure of the air-filled product 200 is further introduced into the connector 130 by the load applied to the air-filled product 200. Then, the air pressure introduced as such is quickly introduced into the space between the diaphragm 131 and the sensor film 141 of the silicon sensor 140 through the inlet 132 of the diaphragm 131 and acts on the sensor film 141.

Then, the sensor film 141 is curved and stretching in an upward direction by the air pressure acting thereon, and the stretching force is transmitted to the impact sensor 160 through the lattice holes 152 formed in the isolating plate 151 of the guide bushing 150. At this time, the stretching force, that is, the impact force, of the sensor film 141 transmitted to the shock sensor 160 is determined by the air pressure acting on the sensor film 141 of the silicon sensor 140, so the jumping height of the user may also be calculated and measured by the impact force transmitted to the shock sensor 160.

The impact detection sensor 160 generates a detection signal by the stretching force of the sensor film 141 as described above and applies the detection signal to the PCB 111, and the PCB 111 lets the number of times of the received detection signals be displayed in numerals through the display unit 114 so as to be easily recognized by the user.

Accordingly, the user of the air-filled product 200 may accurately recognize the amount of exercise or learning since the number of times of jumping appears by being accurately displayed through the air sensor 100.

On the other hand, the air pressure applied to the sensor film 141 as described above is quickly discharged through the outlet 133 of the diaphragm 131, so that the stretched+ sensor film 141 is quickly returned to its original state by its own restoring force and is provided to be flat inside the silicon sensor 140.

As above, although the present disclosure has been described in detail through specific examples, this is for describing the present disclosure in detail, and the present disclosure is not limited thereto. In addition, it is clear that modifications or improvements are possible within the technical scope of the present disclosure by those of ordinary skill in the art.

All simple modifications or changes of the present disclosure belong to the scope of the present disclosure, and the specific protection scope of the present disclosure will be made clear by the appended claims.

<Description of the Reference Numerals in the Drawings>

| | |
|---|---|
| 100: air sensor | 110: upper casing |
| 111: PCB | 112: power switch |
| 113: lighting lamp | 114: display unit |
| 115: cover | 120: lower casing |
| 121: mounting portion | 122: packing |
| 130: connector | 131: diaphragm |
| 132: inlet | 133: outlet |
| 134: pressing protrusion | 135: coupling protrusion |
| 140: silicon sensor | 141: sensor film |
| 142: coupling groove | 150: guide bushing |
| 151: isolating plate | 152: lattice hole |
| 160: impact sensor | 200: air-filled product |

The invention claimed is:

1. An air sensor, provided by being coupled to an air inlet of an air-filled product that maintains a shape thereof by being filled with air, the air sensor comprising:
    a connector coupled to the air inlet and communicating with an interior of the air-filled product, thereby allowing air in the air-filled product to be introduced into an interior of the connector;
    a silicon sensor provided inside the connector, thereby being operated by air pressure of the air-filled product;
    an impact sensor configured to detect an impact caused by an operation of the silicon sensor; and
    a printed circuit board (PCB) connected to the impact sensor, thereby displaying a count of a number of times the air-filled product is pumped according to a detection signal of the impact sensor.

2. The air sensor of claim 1, wherein the connector comprises:
    a diaphragm provided inside the connector, thereby partitioning an inner space of the connector; and
    an inlet and an outlet, respectively formed by penetrating through the diaphragm and configured to allow air pressure of the air-filled product to be introduced and discharged therethrough.

3. The air sensor of claim 2, wherein the inlet is formed in the diaphragm so that a diameter thereof becomes narrower toward the silicon sensor, and
    the outlet is formed in the diaphragm so that a diameter thereof becomes narrower toward the air-filled product.

4. The air sensor of claim 3, wherein the silicon sensor is provided therein with a sensor film facing the diaphragm of the connector, and the sensor film is stretched and contracted toward the impact sensor by air pressure through the inlet of the diaphragm, thereby being detected by the impact sensor.

5. The air sensor of claim 4, wherein an isolating plate is provided between the silicon sensor and the impact sensor to isolate the silicon sensor and the impact sensor from each other, and lattice holes are provided in the isolating plate to allow a stretching force of the sensor film of the silicon sensor to be transmitted to and detected by the impact sensor.

6. An assembly comprising:
    an air-filled product that maintains a shape thereof by being filled with air; and
    an air sensor provided by being coupled to an air inlet of the air-filled product, the air sensor comprising:
        a connector coupled to the air inlet and communicating with an interior of the air-filled product, thereby allowing air in the air-filled product to be introduced into an interior of the connector;
        a silicon sensor provided inside the connector, thereby being operated by air pressure of the air-filled product;

an impact sensor configured to detect an impact caused by an operation of the silicon sensor; and a printed circuit board (PCB) connected to the impact sensor, thereby displaying a count of a number of times the air-filled product is pumped according to a detection signal of the impact sensor.

7. The assembly of claim 6, wherein the connector comprises:

a diaphragm provided inside the connector, thereby partitioning an inner space of the connector; and an inlet and an outlet, respectively formed by penetrating through the diaphragm and configured to allow air pressure of the air-filled product to be introduced and discharged therethrough.

8. The assembly of claim 7, wherein the inlet is formed in the diaphragm so that a diameter thereof becomes narrower toward the silicon sensor, and the outlet is formed in the diaphragm so that a diameter thereof becomes narrower toward the air-filled product.

9. The assembly of claim 8, wherein the silicon sensor is provided therein with a sensor film facing the diaphragm of the connector, and the sensor film is stretched and contracted toward the impact sensor by air pressure through the inlet of the diaphragm, thereby being detected by the impact sensor.

10. The assembly of claim 9, wherein an isolating plate is provided between the silicon sensor and the impact sensor to isolate the silicon sensor and the impact sensor from each other, and lattice holes are provided in the isolating plate to allow a stretching force of the sensor film of the silicon sensor to be transmitted to and detected by the impact sensor.

* * * * *